(12) United States Patent
Houseworth

(10) Patent No.: US 10,241,648 B2
(45) Date of Patent: Mar. 26, 2019

(54) CONTEXT-AWARE FIELD VALUE SUGGESTIONS

(71) Applicant: HRB Innovations, Inc., Las Vegas, NV (US)

(72) Inventor: Jason Houseworth, Olathe, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 211 days.

(21) Appl. No.: 15/056,428

(22) Filed: Feb. 29, 2016

(65) Prior Publication Data

US 2017/0249059 A1    Aug. 31, 2017

(51) Int. Cl.
| | |
|---|---|
| G06F 3/048 | (2013.01) |
| G06F 3/0482 | (2013.01) |
| G06F 3/0488 | (2013.01) |
| G06F 3/16 | (2006.01) |
| G06F 17/24 | (2006.01) |
| G06F 17/30 | (2006.01) |
| G10L 15/26 | (2006.01) |

(52) U.S. Cl.
CPC .......... *G06F 3/0482* (2013.01); *G06F 3/0488* (2013.01); *G06F 3/167* (2013.01); *G06F 17/243* (2013.01); *G06F 17/3064* (2013.01); *G06F 17/30398* (2013.01); *G10L 15/26* (2013.01)

(58) Field of Classification Search
CPC ....................................................... G06F 3/048
See application file for complete search history.

(56) References Cited

U.S. PATENT DOCUMENTS

| | | | |
|---|---|---|---|
| 2010/0114916 A1 | 5/2010 | Cooke | |
| 2010/0293460 A1* | 11/2010 | Budelli | G06F 3/04842 715/702 |
| 2011/0246575 A1* | 10/2011 | Murayama | G06F 17/30011 709/204 |
| 2013/0019182 A1* | 1/2013 | Gil | G06F 3/0482 715/738 |

OTHER PUBLICATIONS

Examination Report No. 1 dated Apr. 12, 2018; Australian Patent Application No. 2017201369; Applicant: HRB Innovations, Inc.

* cited by examiner

*Primary Examiner* — Pei Yong Weng
(74) *Attorney, Agent, or Firm* — Erise IP, P.A.

(57) ABSTRACT

Media, method and device for providing multiple, context-aware suggestion contexts to a user entering text data. To see the multiple suggestion contexts, the user can use a long-press gesture (or other gesture) to bring up a context-aware suggestion menu. This menu can include various suggestion contexts appropriate to the current text-entry field together with an indication of an additional gesture for each suggestion context. Each of these suggestion contexts can draw autocompletions (or other ways of inputting text) from a different source of completions, such as previous entries, common entries by other users, stored values, automatically determined values, and other sources.

20 Claims, 8 Drawing Sheets

CONTEXT-AWARE FIELD VALUE SUGGESTIONS

BACKGROUND

1. Field

Embodiments of the invention generally relate to input techniques for computing devices and, more particularly, to providing suggestions from multiple contexts for faster and easier user input of data.

2. Related Art

Traditionally, user text input on small form-factor computing devices, such as a smartphone, tablet, or other mobile device, has been significantly slower than that available using a traditional keyboard. As such devices have evolved, text-entry techniques have evolved along with them. For example, when cell phones began sending text messages, input was limited to the numeric keypad, requiring users to input multiple button presses for each letter. As smartphones evolved, full keyboards, either physical or on-screen using a touch screen, were added to allow easier text input.

However, the small form factor and limited tactile feedback of such keyboards continued to limit text input to speeds significantly lower than users were accustomed to using a physical keyboard. Accordingly, phone manufacturers began introducing predictive keyboards that could guess the word being typed by the user and allow the user to rapidly accept it after typing only a few characters. Such input techniques can significantly speed up text input. However, the suggestions provided are limited to entries from a presupplied dictionary or words the user has previously typed. As such, they cannot be used when typing information such as addresses, or when the user does not know which value to input. Accordingly, new methods of text input are needed that can suggest values not only from the user's prior entries, but also from a variety of other suggestion contexts.

SUMMARY

Embodiments of the invention address the above-described problem by providing for multiple suggestion contexts to provide the user with the most relevant input suggestions. In particular, in a first embodiment, the invention includes one or more computer-readable media storing computer executable instructions which, when executed by a processor, perform a method of providing context-aware field value suggestions, comprising the steps of displaying, to a user, a text-entry field having a focused mode and a defocused mode, receiving, from the user, a short-press input and, in response, transitioning from the defocused mode to the focused mode, receiving, from the user, a long-press input and, in response, displaying a graphical depiction of a plurality of gestures and a corresponding plurality of input modalities for the text-entry field, receiving, from the user, a gesture of the plurality of gestures, and populating the text-entry field using an input modality corresponding to the received gesture.

In a second embodiment, the invention includes a method of providing context-aware text value suggestions, comprising the steps of displaying an item of data to a user, receiving, from the user, a long-press selection of the item of data, displaying, to the user, a graphical depiction of a plurality of gestures and a corresponding plurality of input modalities, receiving, from the user, a gesture of the plurality of gestures; and using an input modality corresponding to the received gesture to provide the user with a plurality of suggestions for the item of data, and receiving, from the user, a selection of a suggestion of the plurality of suggestions.

In a third embodiment, the invention includes a portable device, comprising a processor, a display, a touch screen, and a computer-readable medium storing computer executable instructions that, when executed, perform a method of context-aware field value suggestions, comprising the steps of displaying, on the display, a text-entry field, receiving, from the user and via the touch screen, a long-press selection of the text-entry field, displaying, on the display, a graphical depiction indicating a plurality of gestures and a corresponding plurality of input modalities, receiving, from the user and via the touch screen, a gesture of the plurality of gestures, and populating the text-entry field using an input modality corresponding to the received gesture.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention add additional sources of suggestions for autocompleting values when the user is entering text. Each of these suggestion contexts can provide auto completions from a different source, and the user can select the appropriate suggestion context to receive suggestions from that context. For example, the user may choose to have values suggested from values they have previously typed, or from values other users have previously typed. Alternatively, certain types of text-entry fields (or other data items) may be particularly amenable to particular suggestion contexts. For example, a text-entry field for supplying an address could be auto completed using the current GPS location of the user, or from the user's address book. Similarly, when entering text for an image, a "common tags" suggestion context may be most useful.

To implement multiple suggestion contexts on a touch screen without burdening the user in the common case, gesture recognition can be employed. For example, where a text-entry field can normally be focused with a short-press gesture, a user can instead use a long-press gesture to bring up a context-aware suggestion menu. This menu can include various suggestion contexts appropriate to the current text-entry field together with an indication of an additional gesture for each suggestion context. Thus, a user who wanted to see how other users responded to a particular question could use a long-press gesture on the response field to bring up the context-aware suggestion menu, determine that the corresponding gesture is a "swipe left" gesture, and then swipe left to see suggestions of commonly entered values for the text-entry field in question.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environments for Embodiments of the Invention

Figure 1:
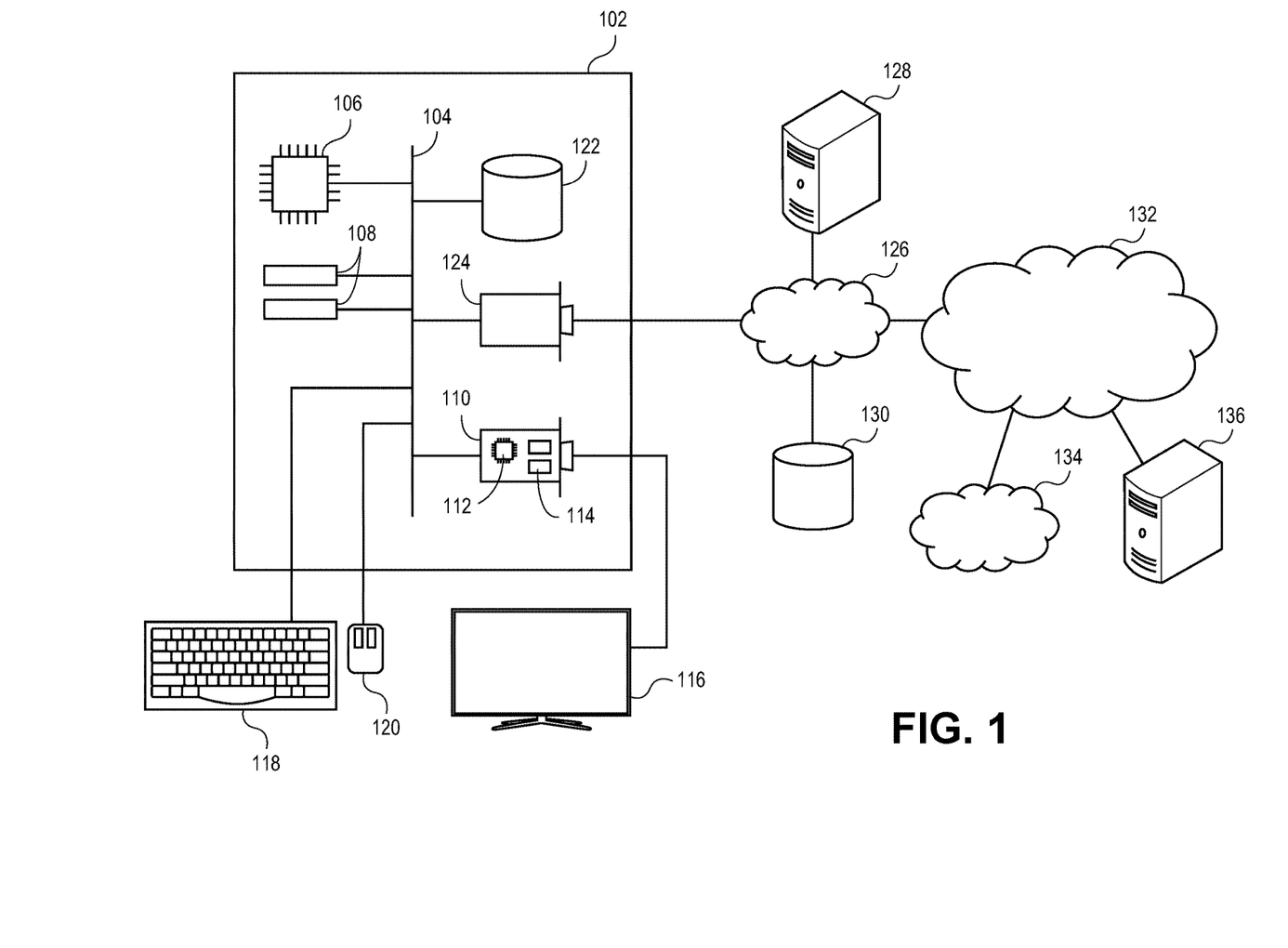
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
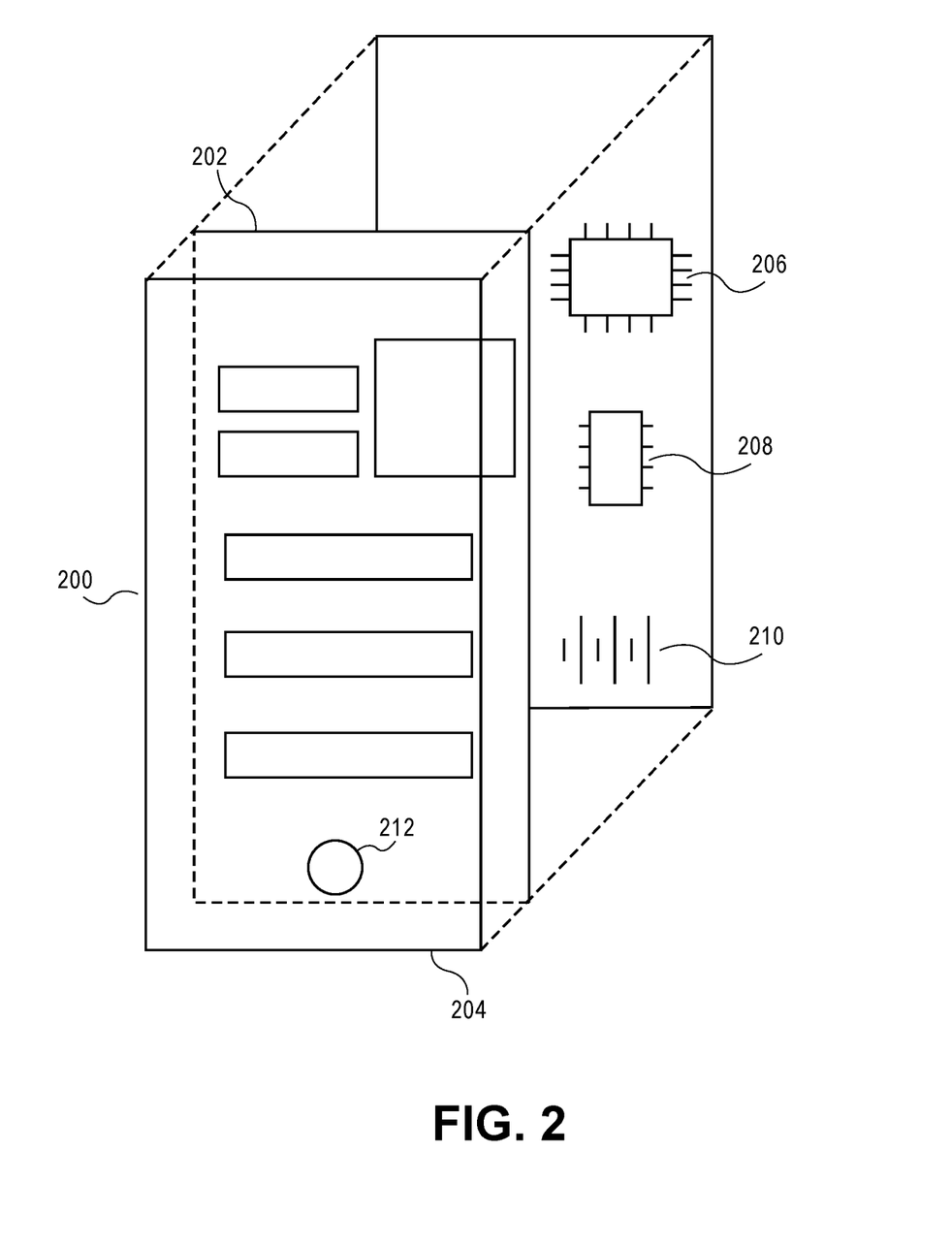
FIG. 2 depicts a second exemplary hardware platform for embodiments of the invention.

Turning next to FIG. 2, a second exemplary hardware platform for embodiments of the invention is depicted, and referred to generally as portable device 200. Device 200 may take the form of a personal telecommunications device, tablet, portable media player, or other small form-factor device. Device 200 includes display 202 for displaying information to a user. Display 202 may be any technology for displaying data, including any form of backlit or ambient liquid-crystal display (LCD), light-emitting diode (LED), such as active-matrix organic LED, electrophoretic ink (e-Ink), or other display technology, now known or later developed. In some embodiments, display 202 may be embodied as a three-dimensional display, such as in a head-mounted display, differential polarization display, or other technology.

Device 200 further includes gestural input device 204. In some embodiments, gestural input device 204 may take the form of a touch screen layered over display 202. In such embodiments, a capacitive touch screen may be used, an acoustic touch screen may be used, or a resistive touch screen may be used. Input may be received using a user's finger or a stylus to interact with the touch screen. In other embodiments, a three-dimensional gestural input recognition system may be employed instead or in addition. For example, one or more cameras (alone or in conjunction with active emitters) can be used to determine the position of the user's hands and/or body and interpret gestures made thereby. In still other embodiments, accelerometer-based gestural input systems can be used to interpret motion and thereby infer the user's gestures.

Device 200 further includes a processor 206, similar to CPU 106 of computer 102, and a storage memory 208, similar to local storage 122 of computer 102. In some embodiments device 200 can be connected to a network or Internet via a wired or wireless network interface analogous to NIC 124. In some such embodiments, device 200 connects to Internet 132 via a cellular data connection. In some embodiments, device 200 includes other components analogous to those of computer 102, such as system bus 104, RAM modules 108, and/or GPU 112 (not shown). In those embodiments where device 200 is a portable device, it may further include battery 210 to allow operation disconnected from an external power source.

In addition to the gestural input device 204, device 200 may further include one or more physical buttons or controls such as button 204. Such physical buttons may be dedicated to a particular function or soft buttons with configurable functionality. For example, device 200 may have dedicated power, volume, and/or home screen buttons. In other embodiments, device 200 may have more or fewer dedicated buttons. In still other embodiments, device 200 may include an integrated or detachable keyboard for text input.

Operation of Embodiments of the Invention

Figure 3A:
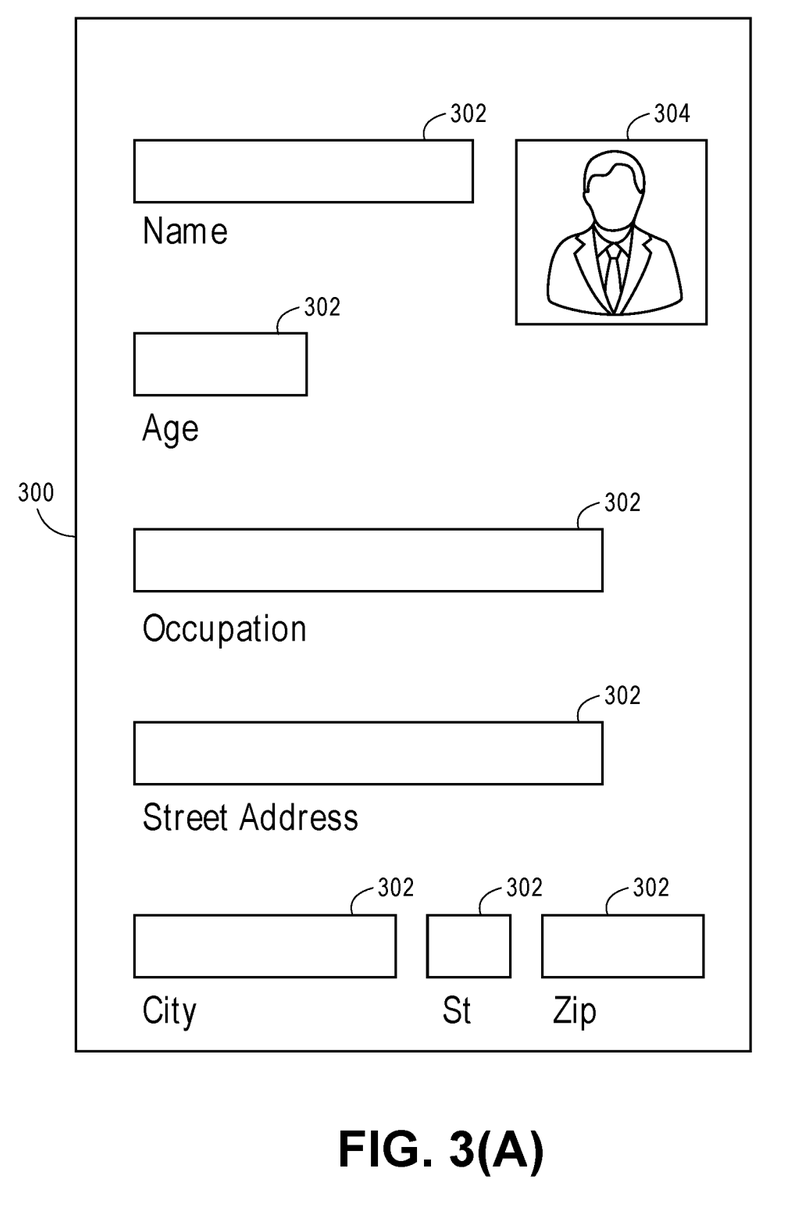
FIG. 3(A) depicts a first view on an exemplary user interface with which embodiments of the invention can be used.

Turning now to FIG. 3(A), a first view on an exemplary user interface with which embodiments of the invention can be used is depicted, and referred to generally by reference numeral 300. Interface 300 includes a plurality of text-entry fields 302 into which a user may enter text. As depicted, text fields 302 of interface 300 represent basic demographic information about a user, as with a profile the user is completing. However, other text-entry fields are also possible. For example, text-entry fields 302 could represent the various fields used to gather information needed to complete a tax return, the details of a purchase being made by the user, or the elements of any other form being completed. In some embodiments, interface 300 also includes other, non-text fields, such as image 304, into which the user can import other, non-textual information. When presented on a display with a touch screen, such as that of device 200, the user may select a field for text entry (also called focusing the field) using a short-press gesture, and then enter text using an on-screen or physical keyboard.

Figure 3B:
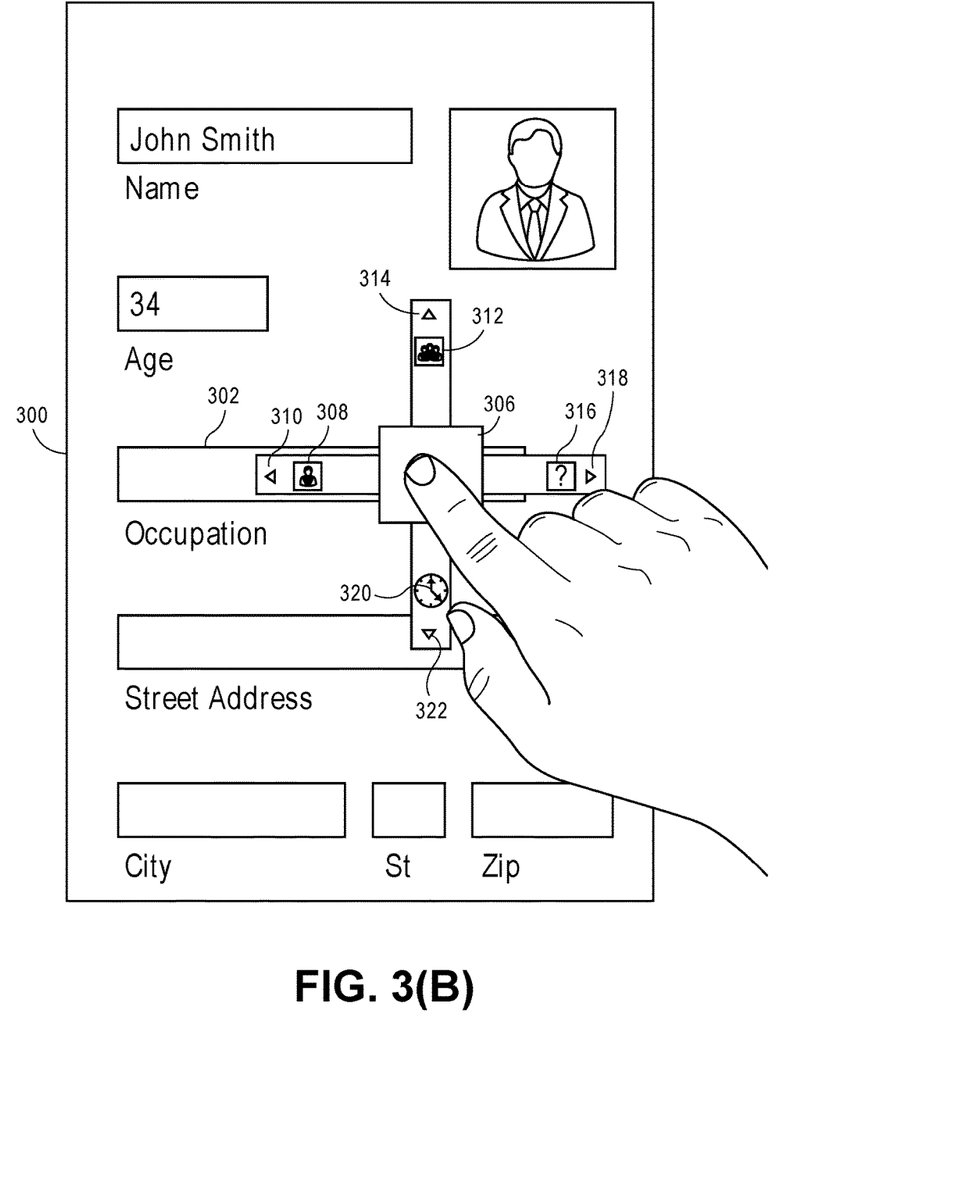
FIG. 3(B) depicts a second view on an exemplary user interface with which embodiments of the invention can be used.

Turning now to FIG. 3(B), a second view of the exemplary user interface with which embodiments of the invention can be used is depicted. As depicted, the user has begun filling out the form of interface 300. When filling out the text-entry field for "Occupation," the user desires a suggested autocompletion for the field. This may be simply to save typing, because the user is unsure how to format a response (e.g., whether to respond "Teacher," "School Teacher" or "Elementary School Teacher"), or because the user does not know the response to the question. In such a case, the user can use a long-press gesture in the relevant text-entry field to bring up the context-aware suggestion menu 306. In contrast to a short press gesture (such as might be used to focus a text-entry field), where the user touches and immediately releases the desired location, a long-press gesture involves the user maintaining contact with the desired location for at least a predetermined period of time. In some embodiments this period may be 500 ms. In other embodiments, it may be 250 ms or 1 second.

Context-aware suggestion menu 306 includes a plurality of gestures and corresponding suggestion contexts. As depicted, the gestures correspond to swipe directions; however, as discussed below, other gestures may be used instead or in addition. For example, "user's previous entries" suggestion context 308 corresponds to "swipe left" gesture 310. Thus, it is indicated to the user that they can see suggestions of previous values they have entered in other text-entry fields 302 by swiping left after the long-press gesture to bring up context-aware suggestion menu 306. Alternatively, the user can access "all users' entries" suggestion context 312 by using "swipe up" gesture 314 to see values commonly entered by other users for this text-entry field. In some cases, suggestion contexts may not suggest values directly. For example, "help" suggestion context 316, accessed using "swipe right" gesture 318 from context-aware suggestion menu 306, may not actually populate text-entry field at all, but rather provide the user with additional instructions for completing the text-entry field. Alternatively, certain suggestion contexts may aggregate values from multiple, other suggestion contexts. For example, "recently accepted" suggestion context 320, accessed using "swipe down" gesture 322, can suggest values from any suggestion context that were recently suggested to, and accepted by, the user.

Figure 3C:
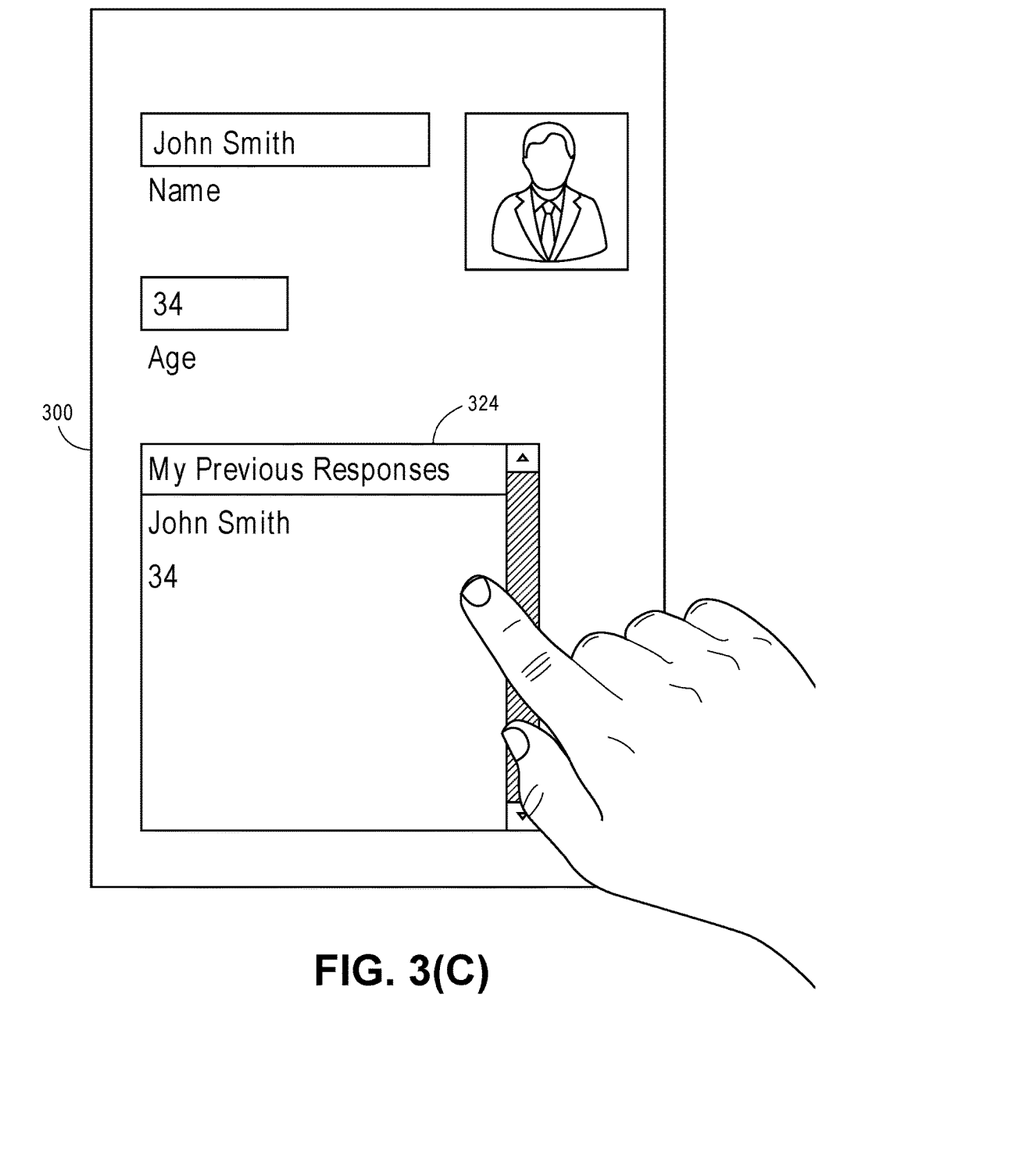
FIG. 3(C) depicts a third view on an exemplary user interface with which embodiments of the invention can be used.

Turning now to FIG. 3(C), a third view of the exemplary user interface with which embodiments of the invention can be used is depicted. In this view, the user has used "swipe left" gesture 310 to access "user's previous entries" suggestion context 308. Accordingly, the context-aware list of the values previously entered in text fields by the user (depicted as reference numeral 324) is presented for the user to select from. In some embodiments, such as that depicted in FIG.

3(C), only those values entered in text-entry fields in the current form are used to suggest values. In other embodiments, all values entered in any form can be suggested in the "user's previous entry" suggestion context 308.

Figure 3D:
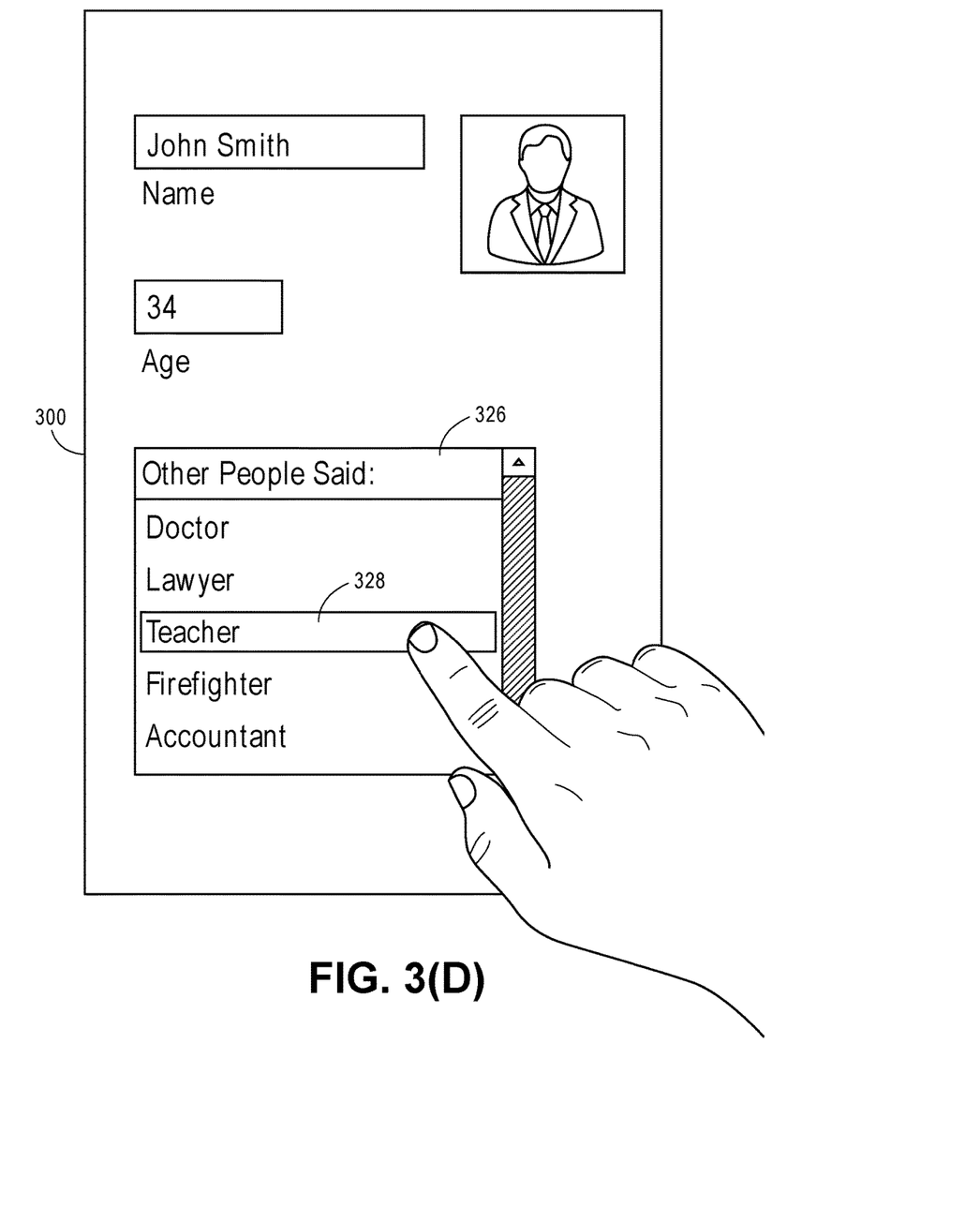
FIG. 3(D) depicts a fourth view on an exemplary user interface with which embodiments of the invention can be used.

Turning now to FIG. 3(D), a fourth view of the exemplary user interface with which embodiments of the invention can be used is depicted. In this view, the user has instead used "swipe up" gesture 314 to select "all users' entries" suggestion context 312. As such, a context-aware list of the most values entered by all users (depicted as reference numeral 326) for this text-entry field 302 is displayed. Thus, unlike prior art where only a single suggestion context is available, the user can choose the suggestion context most appropriate (or most needed) for the text-entry field being completed. Once list 326 is displayed, the user can select the desired value 328 to automatically populate text-entry field 302.

Figure 3E:
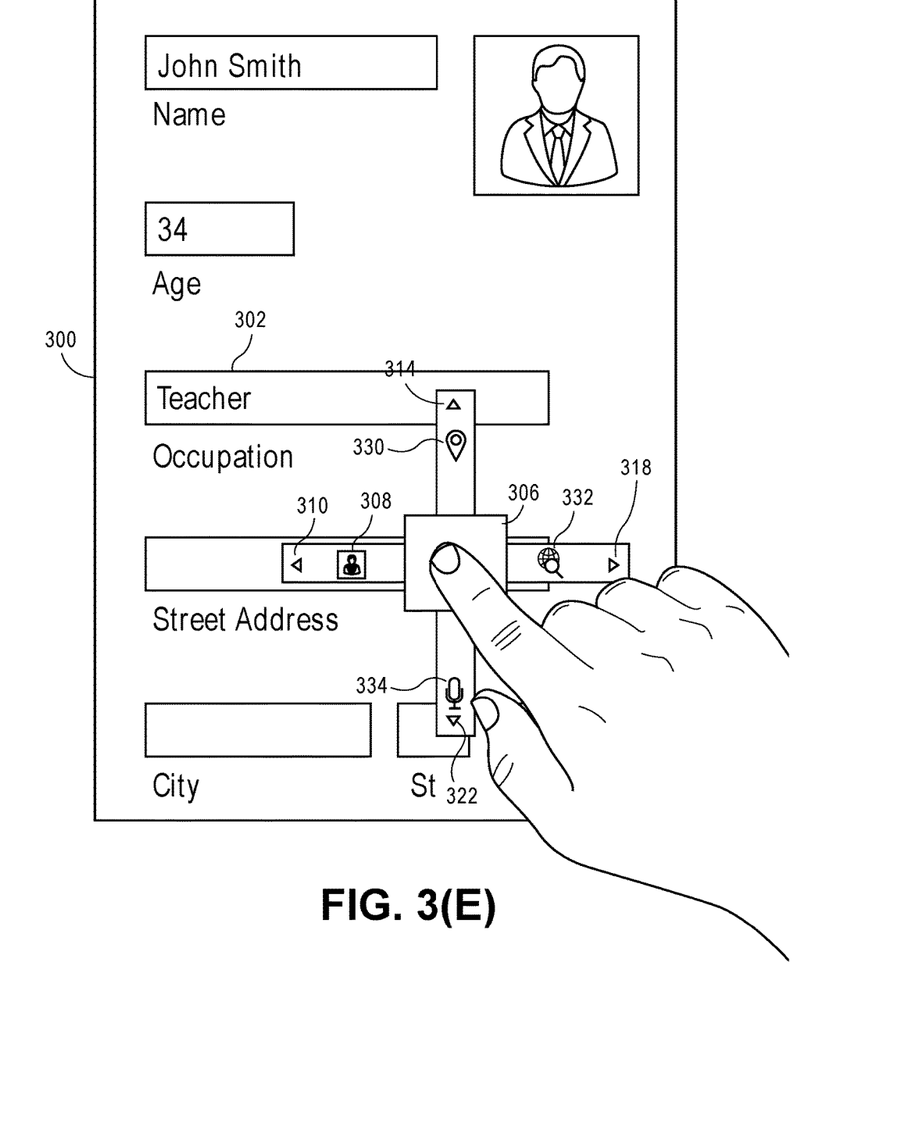
FIG. 3(E) depicts a fifth view on an exemplary user interface with which embodiments of the invention can be used.

Turning now to FIG. 3(E), a fifth view of the exemplary user interface with which embodiments of the invention can be used is depicted. As depicted in this view, each text-entry field 302 can have its own set of suggestion contexts. For example, for the text-entry field 302 corresponding to the user's street address, context-aware suggestion menu 306 includes "user's previous entries" suggestion context 308 corresponding to "swipe left" gesture 310. However, unlike the text-entry field corresponding to the user's occupation, "swipe up" gesture 314 corresponds to "autocomplete using GPS" input modality 330.

As can be seen from FIGS. 3(B) and 3(E), gestures may correspond to more general input modalities than suggestion contexts. While a suggestion context provides the user with a list of potential values to choose from, other input modalities (such as "autocomplete using GPS" input modality 330) may provide a value for a text-entry field 302 without requiring further input from the user. Thus it can be seen that a suggestion context is simply one type of input modality. Other input modalities may require different amounts of user interaction. For example, "find on map" input modality 332 (mapped in FIG. 3(E) to "swipe right" gesture 318) may display a scrollable and zoomable map to allow the user to select a location. Thus, significant user interaction may be required after selecting the input modality. Alternatively, little or no interaction (as with "autocomplete using GPS" input modality 330) may be required. Still other input modalities, such as "voice to text" input modality 334, (mapped in FIG. 3(E) to "swipe down" gesture 322) may require moderate amounts of user interaction. Thus, as can be seen by comparing FIGS. 3(B) and 3(E), the most appropriate input modalities for the text-entry field in question can be displayed for each text-entry field 302.

Figure 4:
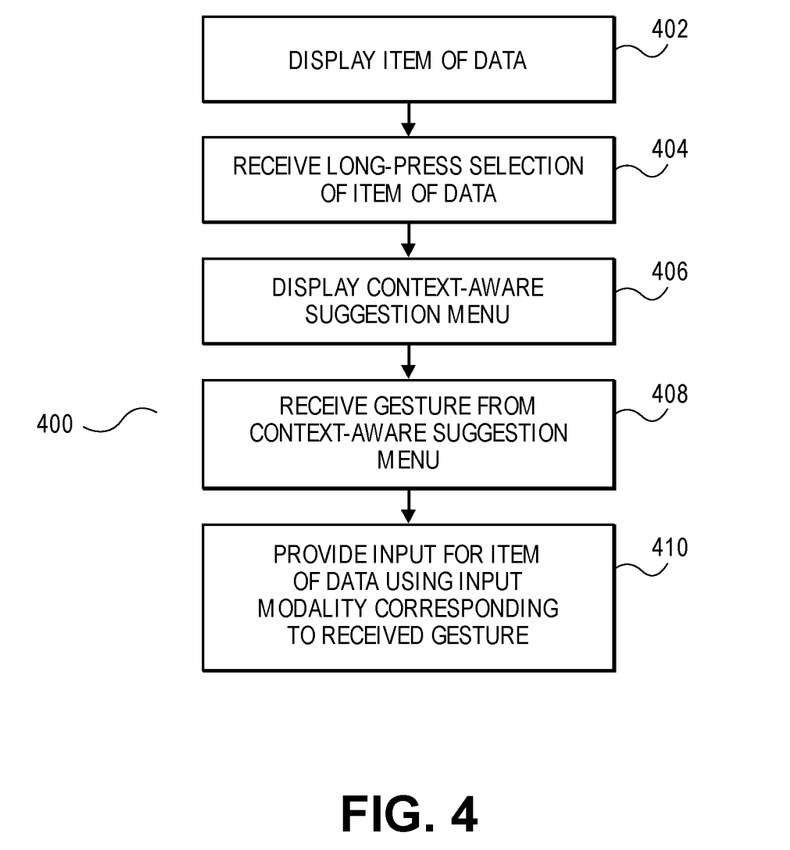
FIG. 4 depicts a flowchart illustrating the operation of a method in accordance with embodiments of the invention.

Turning now to FIG. 4, a flowchart depicting the operation of a method in accordance with embodiments of the invention is depicted, and referred to generally by reference numeral 400. Initially, at a step 402, an item of data is displayed to the user. The above-described text-entry fields are one example of items of data; however, embodiments of the invention can be used with a variety of data items. For example, an email is one example of an item of data. The user can them interact with the email (e.g., respond to it) using method 400. Similarly, a chat message (such as, for example, an SMS, MMS or instant message) is another example of a data item that can be responded to. An image is yet another data item that can be interacted with (for example, to tag it with metadata). Other types of data item will be immediately apparent to one of skill in the art and are also contemplated as being within the scope of the invention.

Next, at a step 404, a long-press selection of the data item is received form the user. As described above, a long-press gesture on a touch screen requires that the user maintain contact with the data item for a period of time longer than that needed to focus the data item. For example, a long-press gesture may be indicated by the user holding their finger on the data item for 250 ms, 500 ms, or 1 second. Other threshold times are also contemplated. In other embodiments, a different gesture is used to activate the context-aware suggestion menu. For example, if a pressure sensitive touch screen is used, a firm-press gesture may instead activate the context-aware suggestion menu. Other gestures to activate the context-aware suggestion menu are also contemplated. In some embodiments, the user must first focus the data item (i.e., transition from a defocused state to a focused state of the data item) using a short-press (or other gesture) before the long-press gesture can be received.

In response to the long press of step 404, the context-aware suggestion menu is displayed to the user at step 406. As described above, the context-aware suggestion menu includes indications of a plurality of gestures, each associated with an indication of an input modality. Input modalities, as discussed above, include a variety of suggestion contexts. For example, "user's previous entries" may provide a list of values previously entered by the user into other text-entry fields on this form or all forms. Similarly, "all users' entries" may provide a list of values commonly entered by other users for the selected data item. A "recently accepted" input modality may combine the suggestions that the user has accepted across all input modalities (or across only suggestion contexts).

Other, non-suggestion input modalities may also be included. For example, "select location on map" or "voice recognition" input modalities may allow a user to provide additional input for the data item. Alternatively, "autocomplete using GPS" or "autocomplete using stored data" may provide the needed information for the data item without requiring any additional user input. Additionally, a "help" input modality may provide the user with assistance in providing the data without providing any data itself. Other input modalities are also contemplated as being within the scope of the invention. As suggested by the name, the set of input modalities provided for each data item are appropriate the context of that data item. For example, a text-entry field (or set of text-entry fields) for indicating an address may be suitable for the "autocomplete using GPS," "select location on map," and "user's previous entries" input modalities. A field for inputting a name may be suitable only for the "user's previous entries" input modality, and a field for inputting the user's occupation or hobbies may be suitable for the "all users' entries" input modality to phrase the user's responses similarly to how other users have phrased theirs.

Next, at step 408, a gesture corresponding to one of the gestures presented as part of the context-aware suggestion menu is received form the user. Gestures include, but are not limited to, taps and multi-taps, swipes and multi-finger swipes (e.g., two finger swipe, three, finger swipe, and so on) in various (cardinal or semi-cardinal) directions, press-and-hold, light press, firm press, pinch in, pinch out, rotation, and edge drag gestures. One of skill in the art, upon reading this disclosure, will appreciate that any of a variety of other gestures can be used when other, non-touch screen input methods are utilized with the invention.

Finally, at step 410, input is provided for the item of data using the input modality corresponding to the gesture received at step 408. The exact way input is provided for a data item will depend on the type of the data item as well as the input modality. For example, where the data item is a text-entry field (as discussed above) the input corresponding to the input modality is entered into the text-entry field. On the other hand, if the data item is an email message, then the input may be used to automatically suggest a reply for the user's approval. Similarly, if the data item is a chat message, the input can be used to automatically compose a response message. On the other hand, if the data item is an image, video, or document, the input can be used to associate metadata (e.g., tags) with the data item. The user may then modify or add to the provided input using conventional input devices or additional input modalities.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer executable instructions which, when executed by a processor, perform a method of completing a text-entry field, comprising the steps of:
    displaying, to a user, an initially blank text-entry field of a form having a focused mode and a defocused mode;
    receiving, from the user, first input and, in response, transitioning from the defocused mode to the focused mode;
    receiving second input of the text-entry field of the form;
    determining a context of the text-entry field of the form;
    determining, based on the context, a plurality of contextual input modalities for the text-entry field,
    wherein each of the plurality of determined contextual input modalities is operable to automatically populate a distinct value into the text-entry field without requiring text entry by the user;
    in response to the second input of the text-entry-field of the form, displaying a graphical depiction of a plurality of gestures and a corresponding plurality of the determined contextual input modalities for the text-entry field;
    receiving, from the user, a gesture of the plurality of gestures;
    determining, based on the gesture, a selected input modality for the text-entry field;
    receiving input data via the selected input modality;
    populating the text-entry field using the input data;
    receiving, from the user, an acceptance of the populated text-entry field.

2. The non-transitory computer-readable media of claim 1, wherein the first input is a short-press input, the second input is a long-press input, and wherein the first input, the second input and the gesture are received via a touch screen.

3. The non-transitory computer-readable media of claim 2, wherein a first gesture of the plurality of gestures is a swipe in a first direction and a second gesture of the plurality of gestures corresponds to a swipe in a second direction.

4. The non-transitory computer-readable media of claim 2, wherein the touch screen is a pressure sensitive touch screen and a gesture of the plurality of gestures is a firm-press gesture.

5. The non-transitory computer-readable media of claim 1, wherein a first modality of the plurality of contextual input modalities includes providing a list of previously entered text-entry field values and receiving, from the user, a selection of a previously entered text entry from the list.

6. The non-transitory computer-readable media of claim 1, wherein a first modality of the plurality of contextual input modalities includes providing a list of text-entry field values entered by other users and receiving, from the user, a selection of a text-entry field value from the list.

7. The non-transitory computer-readable media of claim 1, wherein a first modality of the plurality of contextual input modalities is voice recognition.

8. The non-transitory computer-readable media of claim 1, wherein a first modality of the plurality of contextual modalities includes:
    automatically determining a proposed text-entry field value.

9. A portable device, comprising:
    a processor;
    a display;
    a touch screen; and
    a non-transitory computer-readable medium storing computer executable instructions that, when executed, perform a method of completing a text-entry field, comprising the steps of:
        displaying, on the display, a text-entry field that is initially blank;
        receiving, from the user and via the touch screen, a selection of the text-entry field;
        determining a context for the text-entry field;
        determining, based upon the determined context of the text-entry field, a plurality of contextual input modalities,
        wherein each of the plurality of determined contextual input modalities is operable to automatically populate a distinct value into the text-entry field without requiring text entry by the user;
        displaying, on the display, a graphical depiction indicating a plurality of gestures and a corresponding plurality of the contextual input modalities;
        receiving, from the user and via the touch screen, a gesture of the plurality of gestures; and
        determining, based on the received gesture, a selected input modality;
        determining, based on the selected input modality, a plurality of suggestions for populating the text-entry field;
        receiving, from the user, a selection of a suggestion for populating the text-entry field;
        populating the text-entry field using the selected suggestion.

10. The device of claim 9, wherein the plurality of gestures includes a swipe left gesture and a swipe right gesture.

11. The device of claim 9, wherein the plurality of gestures includes a firm press gesture and a press and hold gesture.

12. The device of claim 9, wherein the plurality of input modalities includes receiving a selection from a plurality of text-entry field values previously entered by the user and automatically determining a value for the text-entry field.

13. The device of claim 9, wherein the plurality of input modalities includes receiving a selection from a plurality of text-entry field values previously entered by other users and voice input.

14. The non-transitory computer-readable media of claim 1, wherein the context of the text-entry field is determined based on a field name for the text-entry field.

15. The non-transitory computer-readable media of claim 14, wherein the field name for the text-entry field indicates an address to be supplied.

16. The non-transitory computer-readable media of claim 15, wherein the selected input modality is a GPS receiver.

17. The non-transitory computer-readable media of claim 15, wherein the selected input modality is a history of previous addresses supplied in an address context.

18. The device of claim 9, wherein the context of the text-entry field is determined based on a field name for the text-entry field.

19. The device of claim 18, wherein the field name for the text-entry field indicates a name to be populated.

20. The device of claim 19, wherein the selected input modality is a list of names previously supplied by the user in a name context.

\* \* \* \* \*